Oct. 27, 1953  J. S. JUDD  2,657,099
PLASTIC WHEEL STRUCTURE
Filed Oct. 27, 1948  2 Sheets-Sheet 1
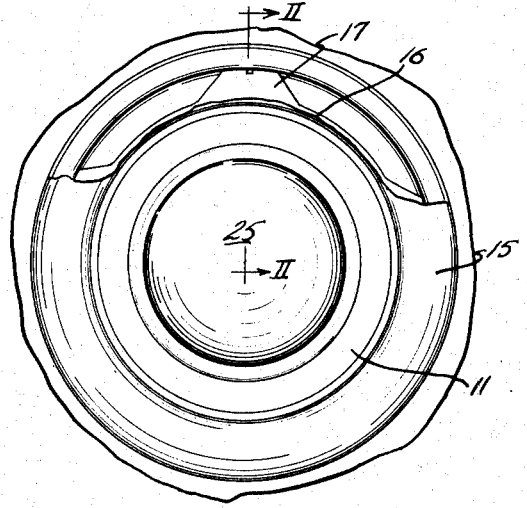
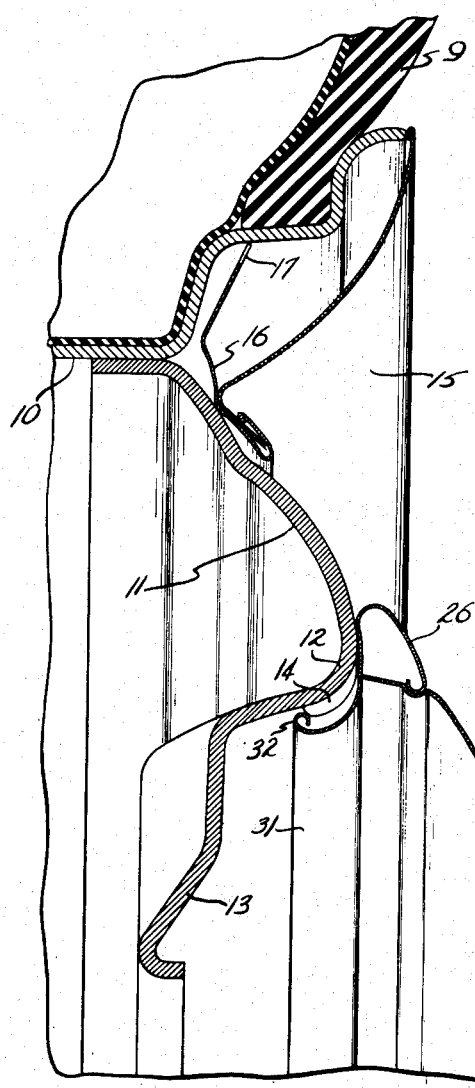
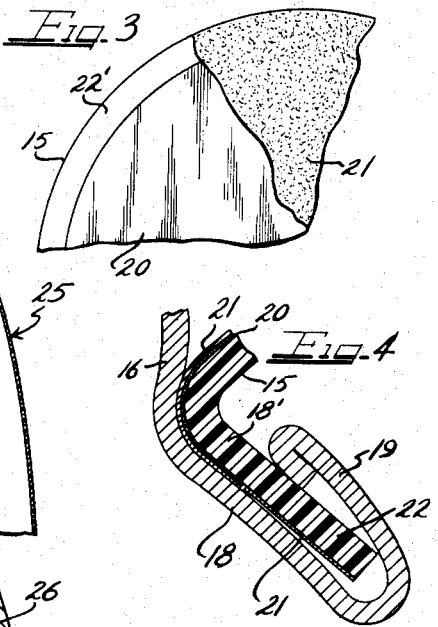
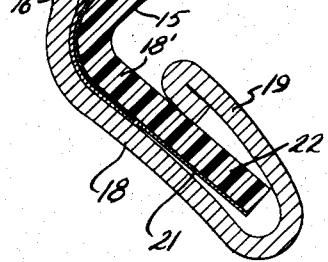
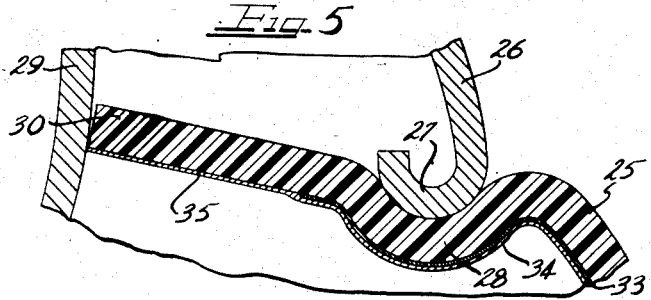
Inventor
JOHN S. JUDD Oct. 27, 1953   J. S. JUDD   2,657,099
PLASTIC WHEEL STRUCTURE
Filed Oct. 27, 1948   2 Sheets-Sheet 2
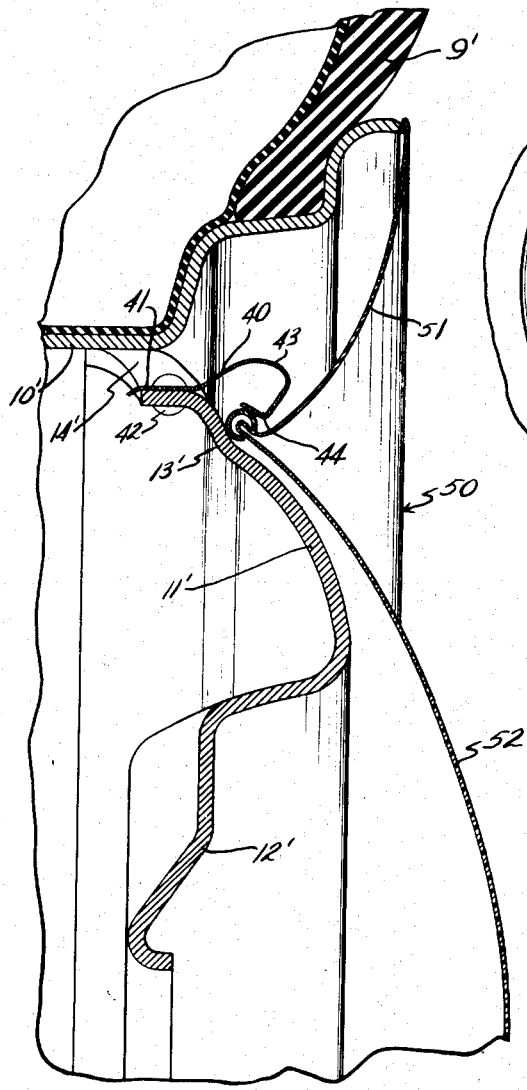
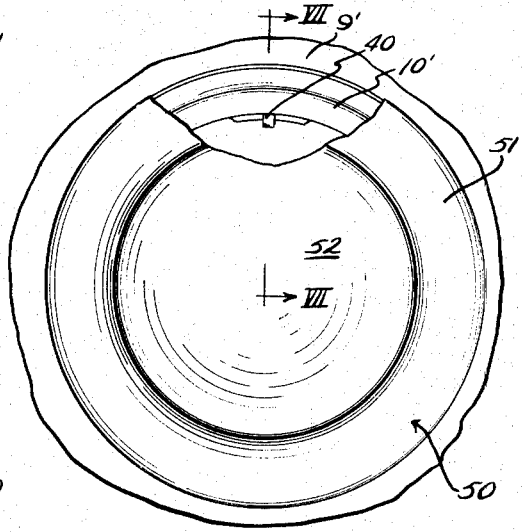
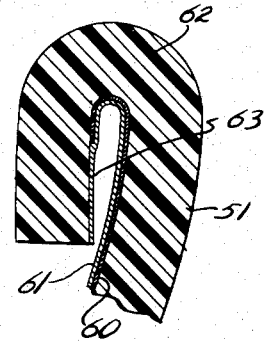
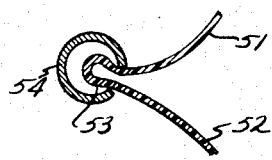
Inventor
JOHN S. JUDD
by ___ Attys.

Patented Oct. 27, 1953

2,657,099

UNITED STATES PATENT OFFICE 2,657,099

PLASTIC WHEEL STRUCTURE

John S. Judd, Birmingham, Mich., assignor to Lyon, Incorporated, Detroit, Mich., a corporation of Delaware Application October 27, 1948, Serial No. 56,779

5 Claims. (Cl. 301—37)

This invention relates to a wheel trim for automobile wheels and more particularly to wheel trims such as wheel caps, covers and rings having a mirror-like appearance.

An object of this invention is to provide a plastic automobile wheel trim of such construction that the mirror deposit on the back side of the plastic is sealed off by a protective coating which terminates beyond the visible deposit in a turned portion of the wheel trim.

Another object of this invention is to provide a wheel trim made from a plastic mirror and wherein the turned or marginal portion of the trim conceals the margin of a protective coating for the mirror deposit beyond the visible portion of the same.

In accordance with the general features of this invention there is provided an article of manufacture comprising a trim for an automobile wheel which includes a circular member of dished cross-sectional shape having at least one edge portion turned laterally therefrom, the member comprising an outer layer of transparent synthetic plastic, a deposit on the under side of the plastic forming a mirror visible through and from the outer side of the plastic and terminating short of the laterally turned edge portion, and a protective coating on the deposit and extending beyond the same onto the turned plastic portion for sealing the edge of the deposit.

In accordance with other features of my invention the foregoing wheel trim structure may be made in a number of different forms including a trim ring, hub cap or a so-called full disk automobile wheel cover.

Other objects and features of this invention will more fully appear from the following detail description taken in connection with the accompanying drawings which illustrate several embodiments thereof and in which:

Figure 1 is a fragmentary side view of a wheel structure having my novel wheel trim applied thereto including a trim ring and a hub cap, a portion of the trim being broken away to show a retaining clip;

Figure 2 is an enlarged fragmentary cross-sectional view taken on substantially the line II—II of Figure 1 looking in the direction indicated by the arrows;

Figure 3 is a rear view of a marginal portion of a trim ring member prior to the forming of the edge of the same and showing the protective coating extending over beyond the edge of the silver or mirror deposit onto the plastic, the coating being broken away to show the deposit;

Figure 4 is an enlarged fragmentary cross-sectional view of the inner margin of the trim ring corresponding to a portion of Figure 2;

Figure 5 is an enlarged fragmentary cross-sectional view of the outer margin of the hub cap shown in Figure 2;

Figure 6 is a side view of a wheel structure having a full wheel disk embodying the features of this invention applied thereto and partly broken away to show the wheel structure;

Figure 7 is an enlarged fragmentary cross-sectional view taken substantially on line VII—VII of Figure 6, looking in the direction indicated by the arrows;

Figure 8 is an enlarged fragmentary cross-sectional view of the outer marginal edge of the disk shown in Figure 7 and corresponding to the outer edge as shown in Figure 7; and Figure 9 is an enlarged fragmentary sectional view showing the junction of the two cover portions going to make up the full disk illustrated in Figure 7.

As shown on the drawings:

The reference character 9 designates generally a pneumatic tire and tube assembly of conventional construction mounted in the usual way upon a multi-flange drop center tire rim 10. This tire rim is carried upon a dished body or spider member 11 having an axially bulged nose portion 12 terminating centrally in a bolt-on flange 13 adapted to be fastened in the usual way by means of bolts or cap screws (not shown) to a part on an axle of an automobile.

The nose portion 12 of member 11 has projecting radially inwardly therefrom a plurality of spaced inclined protuberances or bumps 14 adapted to cooperate in the retention of a hub cap on the wheel.

In accordance with the features of this invention I provide a plastic wheel trim for this wheel in the form of a trim ring 15 and a central hub cap 25. The trim ring 15, as well as the other forms of wheel trim to be hereinafter described including the hub cap 25 and the full disk structure of Figure 7, are all made of a synthetic plastic material of a transparent type. Any suitable conventional transparent plastic may be used for this purpose such, for example, as cellulose acetate, ethylcellulose, cellulose acetate butrate or polished styrene.

This plastic trim ring 15 is of a convex concave cross-sectional shape and is formed of such radial extent as to conceal the side flanges of the rim 10 and to extend down over the junction of the two wheel parts 10 and 11, as shown in Figure 2.

The ring 15 is adapted to be held on the wheel by a metallic retaining ring 16 having formed integral with it a plurality of spaced retaining fingers 17 inclined radially and axially outwardly for gripping engagement with an axial flange of the rim part. The ring 16 includes an inclined portion 18 embracing an inclined or turned portion 18' of the plastic ring and is turned back upon itself at 19 so as to tightly grip the marginal portion 22 of the plastic. This arrangement is such as to provide the plastic trim ring 15 with a reinforced metal inner edge which carries the retaining fingers for holding the plastic trim ring on the wheel.

In accordance with the features of this invention the inner surface of the plastic ring 15 is provided with a silver or mirror deposit 20 which terminates short of the inner and outer margins 22 and 22' of the plastic. Overlying this deposit 20 is a protective lacquer coating 21 which not only covers all of the deposit 20 but extends beyond the same onto the radially outer and inner margins 22 and 22' of the ring for covering and sealing off the edges of the deposit. This deposit 20, as well as the coating 21, are applied to the trim of plastic in accordance with the process disclosed in my copending patent application Serial No. 54,175, filed October 12, 1948. It should be noted that this is also true of the other forms of the invention to be described hereinafter.

From the foregoing it is clear that the plastic ring 15 will have the mirror coating 20 visible therethrough throughout its exposed width and that at the turned outer and inner margins of the ring the protective coating extends beyond the deposit for sealing off the deposit. In other words, I utilize the turned portions which are not readily visible from the outer side of the trim ring for accommodating the extended margins of the protective coating beyond the mirror deposit which does not extend into the turned portions.

In order to avoid duplication I have shown in Figure 3 the outer margin 22' of the ring 15 and in Figure 4 I have shown the inner margin 22. These two illustrations together make it plain that the deposit 20 does not extend over the inner and outer margins of the plastic ring so that relatively small annular areas are left for engagement by the protective coating beyond the edges of the deposit.

As noted in my aforesaid copending application, the protective coating 21 comprises a pigmented butadiene styrene lacquer of a type available on the market. The deposit 20 is a conventional silver deposit such as commonly used in the making of mirrors.

I have also applied my invention to the hub cap 25 which is made of transparent plastic but is provided with a metallic outer ring 26 for snap-on retaining cooperation with the wheel bump 14. The plastic hub cap 25 (Fig. 5) has a rearwardly turned portion 28 indented and engaged by a turned edge 27 of the retaining ring 26. This retaining ring is of a generally U-shaped cross section and includes a rear leg 29 adapted to be engaged by the extreme rear edge 30 of the laterally or rearwardly turned portion 28 of the plastic cap 25.

This cap 25 has its crowned central portion provided with an under coat or deposit of silver 33 which is covered by a protective lacquer 34 like coating 21. As in the first form of the invention the silver deposit 33 does not extend over the marginal portion of the plastic cap 25 so that the protective coating engages the marginal portion at 35 beyond the outer edge of the deposit 33. This enables the coating 34 to seal off and protect the silver deposit rearwardly of the main portion of the cap and at a location not visible from the front of the cap. That is to say, the mirrored part of the cap is visible from the front of the cap but the part that is only covered by the lacquer at 35 is concealed from view.

In the assembly of the cap the metal ring 26 is snapped over the margin of the plastic into the indentation at the turned edge 27 so that the plastic cap 25 is tightly interlocked with the metal ring whereby the ring becomes a component part of the cap. This ring has an underturned skirt 31 with a turned edge 32 adapted to be cammed or snapped over the wheel bumps 14 into retaining cooperation with the rear sides of the bumps 14.

When it is desired to remove the cap the same may be readily effected by inserting a screwdriver under the metal ring 26 and forcibly prying the cap free of the wheel. In this respect it should be noted that in the first form of the invention the trim ring 15 may be removed by flexing the plastic downwardly so that the screwdriver may be inserted behind the same to disengage the fingers 17 from retaining cooperation with the rim of the wheel.

In the form of the invention shown in Figures 6 to 9, inclusive, the pneumatic tire and tube assembly is designated generally by the reference character 9'; it being carried in the usual way upon the multi-flange drop center tire rim 10'.

The tire rim 10' is attached at spaced intervals to a body part 11' which has the usual central bolt-on member or spider 12' for detachably supporting the wheel on an axle of an automobile. The body part 11' has a slight indentation at 13' in which an edge of my cover 50, to be hereinafter described, is adapted to seat.

Also the body part 11' at spaced points, between its areas of attachment to the base of the rim 10', is provided with axial openings 14' of a character well known in the art. They may be of any suitable number such as from 3 to 5 depending upon the design of the wheel.

Cooperable with each of these openings 14' is a cover retaining spring clip 40 having a leg 41 extending into an opening and riveted at 42 to the body part 11'. Each of these spring clips 40 has a gooseneck free extremity 43 terminating in an angular shoulder 44 adapted to engage an edge of my cover 50 in retaining the same on the wheel.

Now I have illustrated one form, which the plastic disk or cover 50 may take, in Figure 7. The cover includes an outer annular portion 51 and a central crown portion 52 with an inwardly dished shoulder 53 connecting the two portions 51 and 52. The intermediate dished or shoulder portion 53 is engaged by the hollow annular snap-on ring 54 made of metal for reinforcing the cover at this shoulder. It is this ring 54 that is adapted to cammingly engage the spring clips 41 when the cover is pressed onto the wheel in retaining cooperation with the spring clips. The cover is easily removable from the wheel by pulling it axially out of engagement with the spring clips 40.

The cover 50 of this form of the invention is made of transparent plastic as aforesaid and is provided on its rear side with a silver deposit 60 and a protective lacquer coating 61 extending beyond the edge of the deposit and over the outer margin of the plastic, as shown at 63 (Figure 8). These coatings are applied in the same manner as the previously described coatings so that the underturned marginal edge 62 of the cover is employed to conceal the breaking off point of the silver deposit 60. This leaves only the mirror or silver deposit 60 visible through the plastic.

It is, of course, to be understood that the entire cover including both the portions 51 and 52 are coated as aforesaid so that when viewed from the outer side the cover appears to be a large mirror with convexly curved portions 51 and 52 confronting or facing each other. This structure provides a highly ornamental lustrous cover for the wheel which is very flashy in appearance and adds greatly to the ornamentation of the automobile.

I claim as my invention:

1. As an article of manufacture a trim for an automobile wheel comprising a circular member of dished cross-sectional shape having at least one edge portion turned laterally therefrom, said member comprising an outer layer of transparent synthetic plastic, a deposit on the under side of said plastic forming a mirror visible through and from the outer side of the plastic and terminating short of the edge of said laterally turned edge portion, and a protective coating on said deposit and extending beyond the same onto said turned portion for sealing the edge of the deposit on the turned portion, said turned portion and the terminus of said deposit being substantially concealed behind a portion of the trim.

2. As an article of manufacture a trim ring for an automobile wheel comprising a circular member of dished cross-sectional shape having its edge portions turned laterally therefrom, said member comprising an outer layer of transparent synthetic plastic, a deposit on the under side of said plastic forming a mirror visible through and from the outer side of the plastic and terminating short of the edges of said laterally turned edge portions, and a protective coating on said deposit and extending beyond the same onto said turned portions for sealing the edges of the deposit on the turned portions, said turned portions and the termini of said deposits being substantially concealed behind portions of the trim.

3. As an article of manufacture a trim for an automobile wheel comprising a circular member of dished cross-sectional shape having at least one edge portion turned laterally therefrom, said member comprising an outer layer of transparent synthetic plastic, a deposit on the under side of said plastic forming a mirror visible through and from the outer side of the plastic and terminating short of the edge of the laterally turned edge portion, and a protective coating on said deposit and extending beyond the same onto said turned portion for sealing the edges of the deposit in the turned portion, said circular member being in the form of a hub cap with a reinforcing outer metal ring enveloping the turned portion for concealing the same as well as the terminus of said deposit and for providing the cover member with greater rigidity at its area of cooperation with a wheel.

4. As an article of manufacture, a cover for disposition at the outer side of a vehicle wheel, said cover comprising a circular member formed from transparent synthetic plastic, a deposit on the inner side of said plastic forming a mirror surface visible through and from the outer side of the plastic, the deposit terminating short of an edge of the plastic, a protective coating on said deposit and extending beyond the terminus of the deposit adjacent to said edge, the margin of the plastic including said edge and the terminus of the deposit being turned under behind the adjacent portion of the plastic containing a full covering of the deposit so that said terminus of the deposit and the portion of the margin therebeyond which is not covered by the deposit is entirely concealed from view.

5. As an article of manufacture, a cover for disposition at the outer side of a vehicle wheel, said cover comprising a circular member formed from transparent synthetic plastic, a deposit on the inner side of said plastic forming a mirror visible through and from the outer side of the plastic, the deposit terminating short of an edge of the plastic member, a protective coating on said deposit and extending beyond the terminus of the deposit adjacent to said edge, and a protective metal member overlying the margin of the plastic member including said edge and completely concealing the terminus of the deposit and the portion of the margin of the plastic member beyond said terminus and therefore remaining without the mirror effect of the deposit from view from the outer side of the cover.

JOHN S. JUDD.

References Cited in the file of this patent

UNITED STATES PATENTS

| Number | Name | Date |
| --- | --- | --- |
| 1,766,509 | Grambach | June 24, 1930 |
| 2,217,086 | Whitacre | Oct. 8, 1940 |
| 2,273,613 | Bartoe | Feb. 17, 1942 |
| 2,368,247 | Lyon | Jan. 30, 1945 |
| 2,368,249 | Lyon | Jan. 30, 1945 |
| 2,368,254 | Lyon | Jan. 30, 1945 |
| 2,493,001 | Lyon | Jan. 3, 1950 |